United States Patent [19]

Kawagoe et al.

[11] Patent Number: 5,849,213
[45] Date of Patent: Dec. 15, 1998

[54] COOLING AND HEATING MEDIUM FOR ICE-STORAGE SYSTEM

[75] Inventors: Tetsuo Kawagoe; Takao Chiba; Yutaka Horie, all of Tokyo, Japan

[73] Assignees: Toshiba Silicone Co., Ltd.; Shin Nippon Kucho Kabushiki Gaisha, both of Tokyo, Japan

[21] Appl. No.: 678,657

[22] Filed: Jul. 11, 1996

Related U.S. Application Data

[63] Continuation of Ser. No. 184,056, Jan. 21, 1994, abandoned.

[30] Foreign Application Priority Data

Jan. 22, 1993 [JP] Japan ................................. 5-008922

[51] Int. Cl.$^6$ ........................................................ C09K 5/00
[52] U.S. Cl. .......................................... 252/78.3; 252/70
[58] Field of Search ......................................... 252/70, 78.3

[56] References Cited

U.S. PATENT DOCUMENTS

| | | | |
|---|---|---|---|
| 3,634,285 | 1/1972 | Brooks | 252/312 |
| 3,711,409 | 1/1973 | Ayres et al. | 252/70 |
| 4,953,360 | 9/1990 | Rzechula | 252/70 |
| 5,032,307 | 7/1991 | Carlson | 252/73 |
| 5,216,033 | 6/1993 | Pereira et al. | 514/844 |

FOREIGN PATENT DOCUMENTS 4-81492  3/1992  Japan .

*Primary Examiner*—Christine Skane
*Attorney, Agent, or Firm*—Antonelli, Terry, Stout & Kraus, LLP

[57] ABSTRACT

Disclosed are a cooling and heating medium for an ice-storage system, which comprises a mixture of a water-insoluble antifreezing solution and water, and an ice-storage system which comprises using a mixture of a water-insoluble antifreezing solution and water as a cooling and heating medium, cooling the cooling and heating medium to obtain a mixture of the water-insoluble antifreezing solution and ice particles and circulating the mixture to convey latent heat.

13 Claims, 1 Drawing Sheet

COOLING AND HEATING MEDIUM FOR ICE-STORAGE SYSTEM

This application is a Continuation application of application Ser. No. 184,056, filed Jan. 21, 1994, now abandoned.

BACKGROUND OF THE INVENTION

This invention relates to a cooling and heating medium for an ice-storage system, an additive for an ice-storage type cooling and heating medium and a system for conveying latent heat by ice storage system, which are used in a thermal storage device for air conditioning or at an heat-service center.

In general, a thermal storage type cooling method is used for the purpose of using inexpensive midnight electric power, which is a method in which water in a thermal storage tank is frozen into ice to effect thermal storage by running a refrigerator by an electric power at midnight and a cooling medium cooled by heat exchange with the ice is conveyed to a heat exchanger at need to cool objects to be cooled.

Thus, in the conventional method, there has been used, as a cooling medium, water melted from ice formed in a thermal storage tank, or water or a brine solution obtained by heat exchange with the ice so that only sensible heat exchange is utilized for cooling objects, and latent heat possessed by ice is not utilized effectively.

If it is possible to mix water as a cooling medium with fine particles of ice and let the mixture flow in a pipeline, there may be obtained advantages that the size of a pipeline for conveying a predetermined amount of heat can be made smaller by latent heat of fusion of ice and also power for conveyance of heat can be reduced. Therefore, there has been investigated a technique of finely pulverizing ice particles to become, for example, sherbet-like ice and let the sherbet-like ice flow in a pipeline, but the technique has problems that once finely pulverized ice is bound to another in a pipeline to form an ice cake with which the pipeline is blocked, and further it is impossible to let the finely pulverized ice uniformly flow due to a difference in specific gravity between ice and water.

In order to solve the above problems, there has been proposed a technique of obtaining good fluidity by adding a polymer swelled by absorbing water to an antifreezing solution to effect icing of water in the polymer to prevent mutual binding of ice (Japanese Provisional Patent Publication No. 366333/1992). However, when the water-swelled polymer is added to an electrolytic type antifreezing solution such as an ethylene glycol aqueous solution and a calcium chloride aqueous solution, it has a tendency to release absorbed water and absorb said antifreezing solution by osmotic pressure so that there is a problem that the absorbed amount of water in the polymer is changed. As a countermeasure to this problem, there has been proposed a method of preventing permeation of electrolyte by forming a protective film on the surface of a polymer or a method of using a hydrophobic brine solution such as oil as an antifreezing solution (Japanese Provisional Patent Publication No. 64839/1992).

However, a technique of forming a protective film on the surface of a polymer without impairing good water absorptivity (absorption property) has not yet been established sufficiently, and when oil is used as an antifreezing solution, oil is generally inert and the surface of a polymer swelled by absorbing water is also inert, whereby there are inconveniences that the swelled polymers are bound to each other due to mutual agglomeration force and further they stick to a thermal storage tank and a pipeline. Therefore, even when water in the polymer is iced, the ice is bound to another in a chain form or sticks to an inner surface of a thermal storage tank or a pipeline so that it is difficult to obtain sherbet-like ice having good fluidity, which is desirable as a cooling and heating medium.

Further, there have been known ice-storage devices each of which comprises storing a water-insoluble cooling medium having a specific gravity 1.5 times or more to that of water and a coagulating point of $-20°$ C. or lower (e.g. a FLUORINERT (trade name, available from Sumitomo 3M Co., Japan) solution) at the bottom of an ice-storage tank at $0°$ C. or lower, conveying the stored medium to the upper portion of the ice-storage tank, spraying the cooling medium from the upper portion of the same and circulating it therein to precipitate ice (Japanese Provisional Patent Publications No. 190028/1992 and No. 313658/1992).

In the above patent publications, it has been disclosed that in a thermal storage tank or in a ice-making machine which is located separately from a thermal storage tank, ice is precipitated by heat exchange caused by contacting and mixing water with a FLUORINERT solution, but it has not been disclosed that a mixture of water and a water-insoluble antifreezing solution as disclosed in the present specification is circulated as a cooling and heating medium.

In the publications, only the FLUORINERT solution is cooled directly by a refrigerator, and it has been only suggested that water cooled in the ice-storage tank is used for cooling objects to be cooled. In such a system, only sensible heat is used for heat exchange with the objects and latent heat is not used for that purpose so that there are problems that it is difficult to make smaller the size of a pipeline for conveying a predetermined amount of heat as compared with the prior art, and also the heating surface of a heat exchanger should be enlarged in order to convey a larger amount of heat.

SUMMARY OF THE INVENTION

The present invention has been accomplished in order to solve the problems as described above, and an object of the present invention is to provide a cooling and heating medium for an ice-storage system, which comprises preparing sherbet-like ice having good fluidity which does not cause icebound (icing) or freezing when it is cooled and using latent heat of the ice to increase a cooling and heating conveying amount so that efficiency for conveyance of heat and economy are heightened, an additive for the cooling and heating medium and a system of conveying latent heat by ice storage using the cooling and heating medium.

The present inventors have studied intensively in order to achieve the above object and consequently found that a cooling and heating medium comprising a mixture of a water-insoluble anti-freeze (antifreezing solution) and water forms a sherbet-like ice having good fluidity which does not cause icing when it is cooled and is useful as a cooling and heating medium for circulation in an ice-storage system, to accomplish the present invention.

DESCRIPTION OF THE PREFERRED EMBODIMENTS

Figure 1:
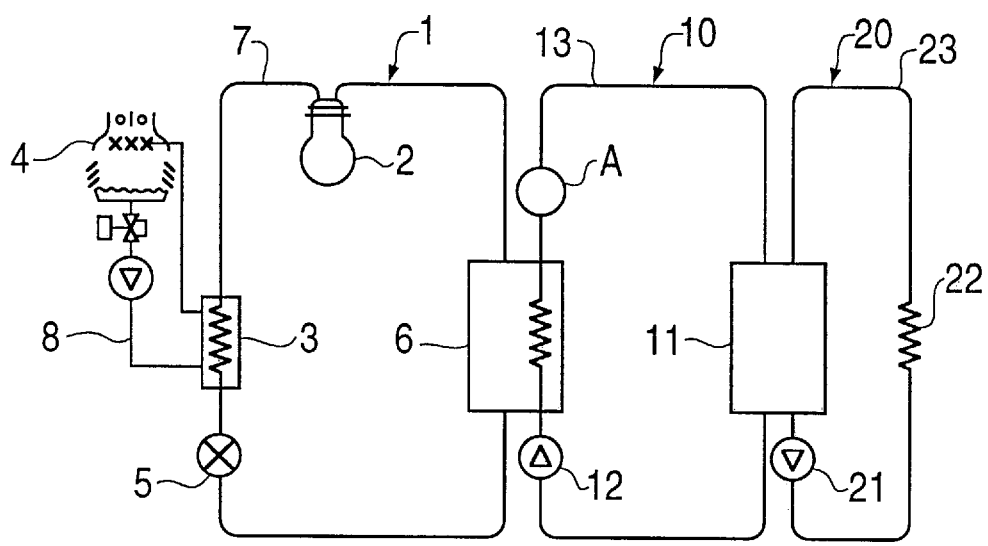
FIG. 1 shows one example of an ice-storage type cooling system using the cooling and heating medium of the present invention.

In the following, the present invention is explained in detail.

In the present invention, as the water-insoluble antifreezing solution, there may be mentioned a silicone oil and a fluorocarbon which are liquid at room temperature (25° C.) and at −20° C., and a mixture of two or more kinds of them may be used.

As the water-insoluble antifreezing solution of the present invention, a water-insoluble antifreezing solution having a viscosity of 0.4 to 10,000 cSt, particularly 0.4 to 3,000 cSt at room temperature is preferred since the properties such as non-icebound (non-icing) property, fluidity and heat transfer property of sherbet-like ice obtained are good.

The above silicone oil is a polyorganosiloxane represented by the formula:

$$R_a SiO_{(4-a)/2} \qquad (A)$$

wherein R is a group selected from the group consisting of a hydroxyl group, an alkoxyl group and a substituted or unsubstituted monovalent hydrocarbon group, and a plural number of R's may be the same or different; and a represents a real number between 1 and 3.

Among the groups described above, R is preferably a hydroxyl group or a monovalent hydrocarbon group, particularly preferably a monovalent hydrocarbon group. As the monovalent hydrocarbon group, there may be mentioned an alkyl group having 1 to 12 carbon atoms, preferably 1 to 6 carbon atoms such as a methyl group, an ethyl group, a propyl group, a butyl group, a hexyl group, an octyl group, a decyl group and a dodecyl group; a cycloalkyl group having 3 to 8 carbon atom such as a cyclohexyl group and a cyclooctyl group; a substituted or unsubstituted aryl group such as a phenyl group and a tolyl group; an alkenyl group having 2 to 6 carbon atoms such as a vinyl group, an allyl group and a propenyl group; and a group in which a part or all of hydrogen atoms bonded to carbon of the above group are substituted by a halogen atom, an amino group, a cyano group, a hydroxyl group, an alkoxyl group, an epoxy group, a carboxyl group, a carboxylic acid ester group or a mercapto group, such as a chloromethyl group, a 3,3,3-trifluoropropyl group and a cyanopropyl group. The monovalent hydrocarbon group is preferably an alkyl group, an aryl group or a fluoroalkyl group, particularly preferably a methyl group, a phenyl group or a 3,3,3-trifluoropropyl group. As the alkoxyl group, there may be mentioned those having 1 to 6 carbon atoms such as a methoxy group, an ethoxy group, a propoxy group and a methoxyethoxy group. The average value of a is suitably 1.8 to 2.2.

As such a polyorganosiloxane, there may be mentioned, for example, dimethylpolysiloxane, diethylpolysiloxane, methylphenylpolysiloxane, methylhexylpolysiloxane, methyl-3,3,3-trifluoropropylpolysiloxane, a polydimethyl-polydiphenylsiloxane copolymer and a polydimethyl-polymethylhexylsiloxane copolymer. As the silicone oil to be used in the present invention, a silicone oil having the viscosity as described above may be used, but a silicone oil having a viscosity of 10 to 200 cSt is preferred in the present invention. When the viscosity is 10 cSt or more, volatility is low and a flash point is heightened, which is advantageous in safety. When it is 200 cSt or less, fluidity is excellent to need less conveying power and also heat transfer efficiency is good, which is advantageous as a component of a cooling and heating medium. The viscosity of the silicone oil is more preferably 50 to 100 cSt.

As the fluorocarbon, there may be mentioned a fluorocarbon in which a part or all of hydrogen atoms bonded to carbon of hydrocarbon are substituted by a fluorine atom, particularly a perfluorocarbon in which all hydrogen atoms are substituted by fluorine atoms. The hydrocarbon may be mentioned an aliphatic hydrocarbon and an aromatic hydrocarbon, and the aliphatic hydrocarbon may include an alicyclic hydrocarbon, a saturated aliphatic hydrocarbon and an unsaturated aliphatic hydrocarbon. The perfluorocarbon herein mentioned is not limited to a perfluorocarbon of which the main chain comprises carbon atoms alone, and a perfluorocarbon partially containing oxygen as an ether bond or containing nitrogen or silicon may be also used.

As such a perfluorocarbon, there may be mentioned perfluorocarbons represented by $C_nF_{2n+2}$ (where n represents an integer of 4 to 12), those represented by the molecular formulae of $C_3F_6$, $C_4F_8$, $C_5F_{10}$, $C_6F_{12}$, $C_6F_{12}O$, $C_6F_{14}$, $C_7F_{14}$, $C_7F_{14}O$, $C_7F_{16}$, $C_8F_{16}O$, $C_8F_{18}$, $C_9F_{18}O$ and $C_{10}F_{20}O$ and those represented by the structural formulae:

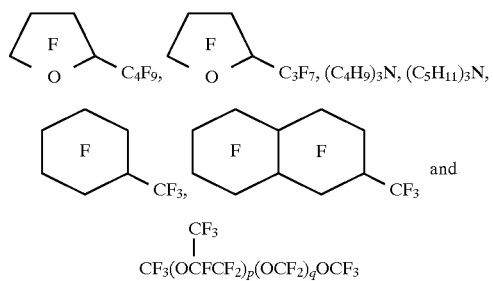

wherein p and q each represent any desired integer which gives a viscosity of 0.4 to 10,000 cSt, preferably integers satisfying the relations of $0 \leq p \leq 10$ and $0 \leq q \leq 10$.

These compounds are used singly or as a mixture.

As the fluorocarbon to be used in the present invention, a fluorocarbon having substantially the same viscosity of the above water-insoluble antifreezing solution may be used, but a fluorocarbon having a viscosity of 0.4 to 100 cSt is preferred in the present invention. The fluorocarbon is incombustible so that a fluorocarbon having low viscosity may be used without a problem of flammability, which is advantageous in safety.

When the silicone oil or perfluorocarbon is used as the water-insoluble antifreezing solution, these oils have low surface tension and sufficiently covers the surfaces of ice particles formed so that they act as a good lubricant for reducing friction between the ice particles and between the ice particles and an inner surface of a pipeline of a circulating route and for preventing icing. Also, these oils have characteristics that they are chemically stable so that they can be handled safely, and they do not corrode metals and plastics so that durabilities of a device or a pipe are not impaired. Further, these oils generally have low coagulating points and can be cooled to a low temperature of about −20° C., and increase in their viscosities at low temperature is small and also lowering of characteristics such as fluidity at low temperature is small, whereby they can be stored at lower temperature. In the case of the silicone oil, there is a characteristic that it has almost the same specific gravity as that of ice so that the resulting cooling and heating medium is a uniform composition.

Water to be used in the present invention is not particularly limited, and may include a distilled water, a deionized water and a tap water, but those which do not contain impurity which remarkably decreases freezing point of water are preferred. If the freezing point of water is too low, it is disadvantageous since a load of a refrigerator for icing water becomes large. The freezing point of water is preferably −10° C. or higher, more preferably −5° C. or higher.

The amount of water to be formulated in the cooling and heating medium for an ice-storage system of the present invention is preferably 10 to 200 parts by weight based on 100 parts by weight of the water-insoluble antifreezing solution. For the purpose of effecting heat exchange by latent heat of ice effectively, the amount is preferably 10 parts by weight or more, and for the purpose of maintaining good fluidity of the cooling and heating medium when water is iced, the amount is preferably 200 parts by weight or less. Particularly when the silicone oil is used as the water-insoluble antifreezing solution, the amount is preferably 30 to 150 parts by weight based on 100 parts by weight of the silicone oil. When the perfluorocarbon is used as the water-insoluble antifreezing solution, the amount is preferably 20 to 100 parts by weight based on 100 parts by weight of the perfluorocarbon.

In the cooling and heating medium of the present invention, in addition to the water-insoluble antifreezing solution and water, other components may be formulated within the range which does not impair the effects of the present invention. Therefore, the amount of water to be formulated in the cooling and heating medium varies depending on the formulation amounts of these components, but the amount of water to be formulated in the cooling and heating medium is generally preferably 10 to 60% by weight, particularly preferably 30 to 50% by weight from the standpoints of efficiency of heat exchange and fluidity of the cooling and heating medium in an iced state.

In the present invention, for the purpose of improving fluidity in a state that water is iced, it is preferred to use a surfactant.

As the surfactant, there may be mentioned an anionic surfactant such as alkylsulfate, polyoxyethylene alkyl ether sulfate, N-acylmethyltaurate, polyoxyethylene alkyl ether acetate, alkylsulfocarboxylate and alkyl phosphate; a nonionic surfactant such as sorbitan aliphatic acid ester, glycerin aliphatic acid ester, polyglycerin aliphatic acid ester, polyoxyethylene glycerin aliphatic acid ester, polyoxyethylene glycol aliphatic acid ester, polyoxyethylene alkyl ether and polyoxyethylene alkylphenyl ether; a cationic surfactant such as an alkylammonium salt and an alkylbenzylammonium salt; a silicone type surfactant such as a polyoxyethylene-polydimethylsiloxane copolymer; and a fluorine type surfactant such as $C_8F_{17}COONH_4$, $C_{10}F_{21}SO_3Na$ and $C_8F_{17}SO_2NHC_2H_4O(C_2H_4O)_{20}H$.

The amount of the surfactant to be used is preferably 0.01 to 20 parts by weight based on 100 parts by weight of the water-insoluble antifreezing solution. When the amount is 0.01 part by weight or more, sherbet-like ice having a small particle size can be easily obtained, and when it is 20 parts by weight or less, the fluidity of the cooling and heating medium in an iced state is good. Particularly when the silicone oil is used as the water-insoluble antifreezing solution, the amount is preferably 0.01 to 5 parts by weight based on 100 parts by weight of the silicone oil. When the perfluorocarbon is used as the water-insoluble antifreezing solution, the amount is preferably 0.5 to 10 parts by weight based on 100 parts by weight of the per-fluorocarbon.

In the cooling and heating medium of the present invention, various additives may be further formulated within the range which does not impair the effects of the present invention. As the additives, there may be mentioned a preservative such as sodium hypochloride, sorbic acid and an isothiazoline type compound; and an anti-corrosive agent such as triethanolamine and a chelating agent, both of which are formulated for the purpose of improving durability of the cooling and heating medium.

For the purpose of increasing water content of the cooling and heating medium, various water-absorptive compounds or water-retentive compounds may be formulated. As the water-absorptive compound, there may be mentioned carboxymethylated compounds of natural polymers such as starches, celluloses and polysaccharides; graft polymers of these natural polymers and acrylonitrile or acrylic acid; and polyvinyl alcohol type, polyacrylic acid salt type (e.g. an alkali metal salt of a polyacrylic acid), polyacrylamide type and polyoxyethylene type synthetic polymers. As the water-retentive compound, there may be mentioned an inorganic compound such as carbon fine powder (e.g. carbon black); and natural or synthetic fiber such as a fiber chip having a ring-shaped or uneven section and water retentivity.

In the present invention, when the water-absorptive compound is formulated, there may be used a powdery water-absorptive compound having a powder shape such as an amorphous powder shape, a spherical particle shape, a scaly shape or a short fiber shape. The powder shape is preferably an amorphous powder shape or a spherical particle shape, particularly preferably a spherical particle shape since the resulting cooling and heating medium has good fluidity. The average particle size of the powder is preferably 10 to 1,000 $\mu$m.

Particularly when the perfluorocarbon is used as the water-insoluble antifreezing solution of the present invention, a water-absorptive polymer compound is preferably used in combination. In this case, there are characteristics that the water absorptivity of the water-absorptive polymer compound is not lowered, and even when the water-absorptive polymer compounds which absorb water are iced, there is no problem that the compounds are bound to each other or a pipeline is blocked by such binding, whereby the cooling and heating medium having good fluidity can be obtained. Further, by using the surfactant in combination, the above characteristics can be exhibited more excellently, and also the dispersibility of the water-absorptive polymer compound in the cooling and heating medium composition is good. When the polymer compound is used in combination, its amount to be formulated is preferably 0.1 to 50 parts by weight, particularly preferably 5 to 20 parts by weight based on 100 parts by weight of the perfluorocarbon.

When an ionic polymer such as polyacrylate is used as the water-absorptive polymer compound, a high rate of water absorption can be obtained. In general, when a water absorption rate is high, a swelling degree is heightened so that when water in the water-absorptive polymer is iced, ice tends to be porous, and as a result, an aqueous antifreezing solution may be absorbed into the ice to lower fluidity. In this case, by controlling formation of porous ice by making the water absorption rate 100 times or less, the fluidity of the cooling and heating medium will be good. The water absorption rate is preferably 10 to 50 times. Also, when nonionic polyethylene oxide is used, there is the same tendency.

In the present invention, a particularly preferred composition example of the cooling and heating medium of the present invention is a mixture of the silicone oil, water and the surfactant or a mixture of the perfluorocarbon, water, the surfactant and the water-absorptive polymer. As an example thereof, there may be mentioned a mixture (emulsion) comprising:

| | |
|---|---|
| Silicone oil | 100 parts by weight |
| Water | 10 to 200 parts by weight |
| Surfactant | 0.01 to 20 parts by weight | or a mixture (emulsion) comprising:

| | |
|---|---|
| Perfluorocarbon | 100 parts by weight |
| Water | 10 to 200 parts by weight |
| Surfactant | 0.01 to 20 parts by weight |
| Water-absorptive polymer | 0.1 to 50 parts by weight. |

When the silicone oil is used, the specific gravity of the silicone oil is almost the same as the specific gravity (0.92) of ice so that the resulting cooling and heating medium has a uniform composition, whereby ice can flow uniformly in a pipeline. When the perfluorocarbon is used, the specific gravity of the perfluorocarbon is about 1.8 times of that of ice, which is convenient when the perfluorocarbon and ice are separated to use ice selectively.

The cooling and heating medium for an ice-storage system of the present invention can be prepared by charging the respective components into of an ice-storage tank of an ice-storage system, and it can be also prepared by mixing the respective components in a different vessel and charging the mixture into an ice-storage tank. In general, a mixture of a water-insoluble antifreezing solution and water is easily separated into the respective components. However, by icing the cooling and heating medium by circulating it in the system, the resulting ice particles can be in a dispersed state, and particularly by adding the surfactant, a better dispersed state can be obtained. When the cooling and heating medium is circulated in the system, the medium can be in a dispersed state by fluid friction stress applied thereto when it passes a heat exchanger, a pipeline or a pump. If necessary, the cooling and heating medium may be dispersed by shaking, stirring or air bubbling before or during running of the ice-storage system, or may be dispersed by using an emulsifying device such as a colloid mill, a homogenizer, a homomixer or an ultrasonic emulsifier. It is sufficient that water is dispersed in a fine particle state particularly at the step of cooling the cooling and heating medium by a refrigerator in the device. Therefore, it is preferred that the above dispersing or emulsifying device is located immediately before the refrigerator. If water particles at the step of cooling by the refrigerator are large, when the resulting ice particle-containing cooling and heating medium is circulated in the system, a pipeline or the like is easily blocked, while if water particles are too small, fluidity is worsened. Therefore, it is generally preferred to disperse water so as to have an average particle size of obtained ice particles of 0.1 to 5 mm although the size may vary depending on the size of the device.

In general, water which is a component of the cooling and heating medium of the present invention is an easily available component so that it may be advantageous in handling that water and other components are handled separately and mixed at a place where the ice-storage system is located. In this case, it is preferred that the cooling and heating medium is prepared by mixing the components other than water to prepare an additive for the cooling and heating medium and formulating the additive into water at a place where the ice-storage system is located. Particularly when the silicone oil is used as the water-insoluble antifreezing solution, it is preferred that the surfactant is formulated into the silicone oil to prepare an additive for the cooling and heating medium. The mixture of the silicone oil and the surfactant can generally be a uniform mixture which is not separated with a lapse of time. Further, the mixture does not contain water so that it is possible to control change in the properties of the mixture caused by change in viscosity or generation of bacteria, whereby storage stability is good, a large space for storage is not required and the mixture can be stored for a long time, which is advantageous in handling.

FIG. 1 shows one example of an ice-storage type cooling system using the cooling and heating medium of the present invention. The system consists of a refrigerator 1, a thermal storage device 10 and a heat-service device 20. The refrigerator 1 comprises a compressor 2, a condenser 3, a water cooling tower 4, an expansion valve 5, a heat exchanger 6 and circuits 7 and 8 connecting these members. The thermal storage device 10 comprises the heat exchanger 6, a thermal storage tank 11, a circulating pump 12 and a circuit 13 connecting these members. The heat service device 20 comprises the thermal storage tank 11, a circulating pump 21, a cooling load 22 and a circuit 23 connecting these members. In this system, a cooling and heating medium A is circulated in the circuits 13 and 23. In the present invention, there may be used a method in which the iced cooling and heating medium is circulated only in the circuit 13 of the thermal storage device 10 and only cooling and heating medium components obtained by separating ice in the thermal storage tank 11 is circulated in the circuit 23 of the heat service device 20.

In the present invention, a cooling and heating medium containing ice can be circulated in good condition in an icestorage system, and neither blocking nor sticking in a pipeline is caused by binding of ice. Further, heat exchange utilizing latent heat of ice can be effected so that there can be obtained characteristics that ability for conveyance of heat can be heightened efficiently and the size of a pipeline can be made smaller to make power for conveyance of heat smaller. In the cooling and heating medium composition of the present invention, even when a water-absorptive polymer is used in combination, the water absorptivity of the polymer is not lowered, the polymers are not bound to each other and the polymer does not stick to a pipeline, whereby good circulation can be carried out. Further, when a silicone oil or a perfluorocarbon is used as a water-insoluble antifreezing solution, their coagulating points are low and lowering of lubricating characteristics at low temperature is small so that the resulting cooling and heating medium can be used at lower temperature, whereby thermal storage and ability for conveyance of heat can be heightened.

EXAMPLES

The present invention is described in detail by referring to Examples. In Examples, "part" means "part by weight" and "%" means "% by weight". Further, a viscosity value is a value at 25° C.

Example 1

100 parts of polydimethylsiloxane having a viscosity of 50 cSt, 0.7 part of sodium acylmethyltaurate DIAPON-T Powder (trade name, produced by Nippon Oil & Fats Co., Ltd.) and 43.2 parts of water were mixed by a colloid mill to prepare a cooling and heating medium A1. The medium A1 was circulated by using the device shown in FIG. 1, and fluidity was evaluated. The fluidity was measured at 25° C. 0° C. and −5° C. In the measurement at −5° C., a state of ice obtained was also evaluated. The results are shown in Table 1.

EXAMPLE 2

100 parts of polymethylphenylsiloxane having a viscosity of 100 cSt and a phenyl group content of 40 mole %, 0.36 part 5 of sodium acylmethyltaurate and 43.0 parts of water were mixed in the same manner as in Example 1 to prepare a cooling and heating medium A2. The medium A2 was evaluated in the same manner as in Example 1. The results are shown in Table 1.

Example 3

100 parts of polymethyloctylsiloxane having a viscosity of 200 cSt and an octyl group content of 60 mole %, 0.36 part 15 of sodium dodecylbenzenesulfonate NEWREX paste H (trade name, produced by Nippon Oil & Fats Co., Ltd.) and 43.0 parts of water were mixed in the same manner as in Example 1 to prepare a cooling and heating medium A3. The medium A3 was evaluated in the same manner as in Example 1. The 20 results are shown in Table 1.

Example 4

100 parts of polydimethylsiloxane having a viscosity of 100 cSt and 25.0 parts of water were mixed in the same manner as in Example 1 to prepare a cooling and heating medium A4.

The medium A4 was evaluated in the same manner as in Example 1. The results are shown in Table 1.

Example 5

100 parts of polydimethylsiloxane having a viscosity of 100 cSt, 0.7 part of polyoxyethylene nonylphenyl ether Nonion HS-210 (trade name, produced by Nippon Oil & Fats Co., Ltd.) and 43.2 parts of water were mixed in the same manner as in Example 1 to prepare a cooling and heating medium A5. The medium A5 was evaluated in the same manner as in Example 1. The results are shown in Table 1.

Example 6

100 parts of a perfluorocarbon, FLUORINERT PF5080 (trade name, Sumitomo 3M Co.) having a viscosity of 0.7 cSt, 0.7 part of sodium acylmethyltaurate, 10 parts of a polyacrylate type water-absorptive polymer Aquarick CA (trade name, produced by Nihon Shokubai Kagaku Kogyo Co.) and 60 parts of water were mixed by stirring to prepare a cooling and heating medium A6. The medium A6 was evaluated in the same manner as in Example 1. The results are shown in Table 1.

Comparative example 1

A cooling and heating medium B1 was prepared in the same manner as in Example 1 except for using ethylene glycol in place of polydimethylsiloxane. The medium B1 was evaluated in the same manner as in Example 1. The results are shown in Table 1.

Comparative example 2

A cooling and heating medium B2 was prepared in the same manner as in Example 1 except for using 1,2,3-trichloropropane having a coagulating point of −14.7° C. in place of polydimethylsiloxane. The medium B2 was evaluated in the same manner as in Example 1. The results are shown in Table 1.

The fluidity and state of ice were evaluated according to the following standards, respectively.

TABLE 1

| | Temperature of cooling and heating medium | | | |
|---|---|---|---|---|
| | 25° C. | 0° C. | −5° C. | |
| | Fluidity | Fluidity | Fluidity | State of ice |
| Example 1 | ⊚ | ⊚ | ⊚ | ○ |
| Example 2 | ⊚ | ⊚ | ○ | ○ |
| Example 3 | ⊚ | ⊚ | ○ | ○ |
| Example 4 | ⊚ | ⊚ | Δ | Δ |
| Example 5 | ⊚ | ⊚ | ○ | ○ |
| Example 6 | ⊚ | ⊚ | Δ | Δ |
| Comparative example 1 | ⊚ | ⊚ | ○ | X |
| Comparative example 2 | ⊚ | Δ | X | XX |

Fluidity
⊚: Excellent fluidity
○: Good fluidity.
Δ: Slightly poor fluidity and flow rate is small
X: No fluidity
State of ice
○: Soft sherbet state
Δ: Slightly hard sherbet state
X: Not-iced or hard ice state
XX: Hard ice state As clearly seen from the above results, it can be understood that the cooling and heating media of the present invention show excellent fluidity even at a low temperature of −5° C. and have good conditions as ice.

We claim:

1. A cooling an heating medium having a sherbet-like ice form for circulation in an ice-storage system, prepared by a process comprising icing and cooling a cooling and heating medium while circulating in an ice storage system, wherein said cooling and heating medium comprises 100 parts by weight of a silicone oil having a viscosity of 10 to 200 cst at room temperature, 25 to 150 parts by weight of water, and 0.01 to 20 parts by weight of a surfactant based on parts by weight of the silicone oil; said medium having a sherbet-like ice form and having fluidity during circulation.

2. The medium according to claim 1, wherein the silicon oil has a viscosity of 50 to 100 cSt at room temperature.

3. The medium according to claim 1, wherein water is contained in an amount of 30 to 150 parts by weight based on 100 parts by weight of the silicone oil.

4. The medium according to claim 1, wherein the silicone oil is a polyorganosiloxane represented by the formula:

$$RaSiO_{(4-a)/2} \quad (A)$$

wherein R is a group selected from the group consisting of a hydroxyl group, an alkoxyl group and a substituted or unsubstituted monovalent hydrocarbon group, and a plural number of R's may be the same or different; and a represents a real number between 1 and 3.

5. The medium according to claim 4, wherein the polyorganosiloxane is at least one member selected from the group consisting of dimethylpolysiloxane, diethylpolysiloxane, methylphenylpolysiloxane, methylhexylpolysiloxane, methyl-3,3,3-trifluoropropylpolysiloxane, a polydimethylpolydiphenylsiloxane copolymer and a polydimethylpolymethylhexylsiloxane copolymer.

6. The medium according to claim 1, wherein the surfactant is at least one member selected from the group consisting of alkylsulfate, polyoxyethylene alkyl ether sulfate, N-acylmethyltauric acid, polyoxyethylene alkyl ether acetate, alkylsulfoncarboxylate, alkyl phosphate, sorbitan aliphatic acid ester, glycerin aliphatic acid ester, polyglycerin aliphatic acid ester, polyoxyethylene glycerin aliphatic acid ester, polyoxyethylene glycol aliphatic acid ester, polyoxyethylene alkyl ester, polyoxyethylene alkylphenyl ether, an alkylammonium salt, an alkylbenzylammonium salt, a polyoxyethylene-polydimethylsiloxane copolymer, $C_8F_{17}COONH_4$, $C_{10}F_{21}SO_3Na$ and $C_8F_{17}SO_2NHC_2H_4O(C_2H_4O)_{20}H$.

7. The medium according to claim 1, wherein the surfactant is contained in an amount of 0.01 to 5 parts by weight based on 100 parts by weight of the silicone oil.

8. The medium according to claim 1, wherein the medium consists of the silicone oil water and surfactant.

9. The medium according to claim 3, wherein the amount of water in the medium is 10 to 60% by weight.

10. The medium according to claim 9, wherein the medium further comprises a water-absorptive compound.

11. The medium according to claim 10, wherein the water-absorptive compound is at least one member selected from the group consisting of a carboxymethylated compound of starch, cellulose or polysaccharide; a graft polymer of starch, cellulose or polysaccharide; a graft polymer of acrylonitrile or acrylic acid; and a polyvinyl alcohol, a polyacrylate, a polyacrylamide and a polyoxyethyleye.

12. The medium according to claim 1, wherein said cooling medium has fluidity at $-5°$ C.

13. A cooling and heating med having a sherbet-like ice form for circulation in an ice-storge system, prepared by a process comprising icing and cooling a cooling and heating medium while circulating in an ice storage system, wherein said cooling and heating medium consists essentially of 100 parts by weight of a silicone oil having a viscosity of 10 to 200 cst at room temperature, 25 to 150 parts by weight of water, and 0.01 to 20 parts by weight of a surfactant based on parts by weight of the silicone oil;

said medium having a sherbet-like ice form comprising ice particles covered by the silicone oil, said ice particles have fluidity during circulation which is obtained by icing the cooling and heating medium while circulating in an ice storage system.

* * * * *